US012515484B2

(12) United States Patent
Forthoffer et al.

(10) Patent No.: US 12,515,484 B2
(45) Date of Patent: Jan. 6, 2026

(54) TRAILER WIRING HARNESS WITH INTEGRATED CELLULAR TRACKING DEVICE

(71) Applicant: R.A. PHILLIPS INDUSTRIES, INC., Santa Fe Springs, CA (US)

(72) Inventors: Daniel William Forthoffer, Birmingham, MI (US); Thomas Dale Peterson, Glendora, CA (US)

(73) Assignee: R.A. Phillips Industries, Inc., Irvine, CA (US)

( * ) Notice: Subject to any disclaimer, the term of this patent is extended or adjusted under 35 U.S.C. 154(b) by 461 days.

(21) Appl. No.: 18/148,367

(22) Filed: Dec. 29, 2022

(65) Prior Publication Data

US 2023/0211638 A1 Jul. 6, 2023

Related U.S. Application Data

(60) Provisional application No. 63/295,241, filed on Dec. 30, 2021.

(51) Int. Cl.
*B60D 1/26* (2006.01)
*B60D 1/58* (2006.01)

(52) U.S. Cl.
CPC ........ *B60D 1/26* (2013.01); *B60D 1/58* (2013.01)

(58) Field of Classification Search
CPC ............... B60D 1/26; B60D 1/58; B60D 1/62
USPC ..................................................... 280/479.1
See application file for complete search history.

(56) References Cited

U.S. PATENT DOCUMENTS

| 5,739,592 | A | * | 4/1998 | Rigsby | B60D 1/62 |
| | | | | | 701/32.7 |
| 9,434,308 | B2 | * | 9/2016 | Bean | G01R 31/007 |
| 10,207,642 | B2 | * | 2/2019 | Bean | H01R 9/18 |
| 10,309,824 | B2 | * | 6/2019 | Fredrickson | B60D 1/248 |
| 10,502,772 | B2 | * | 12/2019 | Slade | H05B 45/58 |
| 11,125,881 | B2 | * | 9/2021 | Chen | G01S 17/86 |
| 2008/0303648 | A1 | | 12/2008 | Day | |
| 2018/0009377 | A1 | | 1/2018 | Troutman et al. | |
| 2020/0174055 | A1 | * | 6/2020 | Pampattiwar | B60Q 11/007 |
| 2021/0046987 | A1 | * | 2/2021 | Bean | G05B 9/02 |
| 2021/0112318 | A1 | * | 4/2021 | Troutman | H04L 67/12 |
| 2021/0354521 | A1 | * | 11/2021 | Slade | B60D 1/62 |

FOREIGN PATENT DOCUMENTS

WO   WO 2016-028818 A1   2/2016

OTHER PUBLICATIONS

International Search Report issued in corresponding application No. PCT/US2022/054290, dated Apr. 27, 2023, 3 pages.
Written Opinion issued in corresponding application No. PCT/US2022/054290, dated Apr. 27, 2023, 5 pages.

\* cited by examiner

*Primary Examiner* — Hau V Phan
(74) *Attorney, Agent, or Firm* — Womble Bond Dickinson (US) LLP (57) ABSTRACT

A harness tracking system includes a main body, a first connector at a first end of the main body and including a plurality of terminals configured to transmit electrical signals, a plurality of wires at a second end of the main body opposite the first end, the plurality of wires being electrically connected to the plurality of terminals of the first connector, and a tracking circuit embedded within the main body and configured to track a position of the harness tracking system and to communicate the position to an external device.

19 Claims, 8 Drawing Sheets

TRAILER WIRING HARNESS WITH INTEGRATED CELLULAR TRACKING DEVICE

CROSS-REFERENCE TO RELATED APPLICATION(S)

This application claims priority to, and the benefit of, U.S. Provisional Application No. 63/295,241 ("TRAILER WIRING HARNESS WITH INTEGRATED CELLULAR TRACKING DEVICE"), filed on Dec. 30, 2021, the entire content of which is incorporated herein by reference.

FIELD

Aspects of the invention relate to the field of wiring harnesses for heavy duty vehicles.

BACKGROUND

Recently, the use of telematics has become more common in the trucking industry. Telematics devices are often installed at the nose of a commercial vehicle trailer or underneath the trailer. Telematics devices may report data back to the end customer that include vehicle location, vehicle speed, sensor data, and the like. The sensors may monitor for safety concerns, such as status of brake components, refrigerated compartment temperatures, door open/closed status, etc.

Installation of these devices may be cumbersome as the installer generally has to splice into an existing harness, which could void the warranty or allow corrosion into the electrical system.

The above information disclosed in this Background section is only for enhancement of understanding of the invention, and therefore it may contain information that does not form the prior art that is already known to a person of ordinary skill in the art.

SUMMARY

Aspects of some embodiments of the invention are directed toward a cellular tracking system that is pre-installed/embedded into the trailer electrical harness, which eliminates the need for a retrofit installation of a tracking device. This system can be activated remotely without access to the trailer. Further, the inconspicuous location of the embedded tracking device substantially reduces the potential for unauthorized tampering.

According to some embodiments of the present invention, there is provided a harness tracking system including: a main body; a first connector at a first end of the main body and including a plurality of terminals configured to transmit electrical signals; a plurality of wires at a second end of the main body opposite the first end, the plurality of wires being electrically connected to the plurality of terminals of the first connector; and a tracking circuit embedded within the main body and configured to track a position of the harness tracking system and to communicate the position to an external device.

In some embodiments, the main body includes: a base portion having a depression configured to accommodate the tracking circuit; and an overmold portion molded over the base portion and configured to entirely encapsulate the tracking circuit to protect the tracking circuit from environmental elements.

In some embodiments, in the first connector is configured to mate with, and be in electrical communication with, a harness connector coupled to a nosebox of a trailer, and the plurality of wires are configured to transmit power to a plurality of electrical devices in the trailer.

In some embodiments, the plurality of electrical devices includes at least one of a trailer light, an anti-lock braking system (ABS), a trailer refrigerator, a liftgate motor, and a backup battery.

In some embodiments, the first connector is a male connector or a female connector, and the external device is an external server or a mobile device.

In some embodiments, the tracking circuit includes: a global positioning system (GPS) circuit configured to track the position of the harness tracking system; a cellular transceiver configured to communicate the position to the external device in response to a command received from external device; and a controller configured to control operations of the GPS circuit and the cellular transceiver.

In some embodiments, the harness tracking system further includes: a data port at the main body and configured to receive sensor data from an external data interface board and to transmit the sensor data to the controller, wherein the controller is further configured to receive the sensor data from the external data interface board via the data port, to process the sensor data, and to communicate the processed sensor data to the cellular transceiver for transmission to the external device.

In some embodiments, the controller is configured to receive data from the external data interface board according to an RS232 or an RS45 protocol, and the external data interface board is configured to receive and process data from at least one of a brake sensor, a light sensor, a temperature sensor, a tire pressure sensor, a wheel speed sensor, smoke detector, speedometer, a vibration sensor, an axle hub sensor, a brake wear sensor, a door sensor, a position sensor, a digital microphone, and a camera.

In some embodiments, the plurality of terminals includes a power terminal and a ground terminal connected to the tracking circuit, and the tracking circuit is configured to be powered by the power terminal.

In some embodiments, the harness tracking system further includes: a charge port configured to be coupled to an external battery, and to charge the external battery in the presence of electrical power at the power terminal, wherein, in the absence of electrical power at the power terminal, the tracking circuit is configured to receive electrical power from the external battery through the charge port.

In some embodiments, the harness tracking system further includes: an auxiliary port configured to be coupled to an auxiliary power source of a trailer, and to receive electrical power from the auxiliary power source in the absence of electrical power at the power terminal.

According to some embodiments of the present invention, there is provided a harness tracking system including: a main body; a first connector at a first end of the main body and including a plurality of terminals configured to transmit electrical signals, the plurality of terminals includes a power terminal and a ground terminal; a plurality of wires at a second end of the main body opposite the first end, the plurality of wires being electrically connected to the plurality of terminals of the first connector; a tracking circuit embedded within the main body and configured to track a position of the harness tracking system and to communicate the position to an external device, the tracking circuit being configured to be powered by the power terminal; and a charge port configured to be coupled to an external battery, to supply electrical charge to the external battery in the presence of electrical power at the power terminal, and to receive electrical power from the external battery in the absence of electrical power at the power terminal.

In some embodiments, the main body includes: a base portion having a depression configured to accommodate the tracking circuit; and an overmold portion molded over the base portion and configured to entirely encapsulate the tracking circuit to protect the tracking circuit from environmental elements.

In some embodiments, the first connector is configured to mate with, and be in electrical communication with, a harness connector coupled to a nosebox of a trailer, and the plurality of wires are configured to transmit power to a plurality of electrical devices in the trailer.

In some embodiments, the tracking circuit includes: a global positioning system (GPS) circuit configured to track the position of the harness tracking system; a cellular transceiver configured to communicate the position to the external device in response to a command received from external device; and a controller configured to control operations of the GPS circuit and the cellular transceiver.

According to some embodiments of the present invention, there is provided a harness tracking system including: a main body; a first connector at a first end of the main body and including a plurality of terminals configured to transmit electrical signals; a plurality of wires at a second end of the main body opposite the first end, the plurality of wires being electrically connected to the plurality of terminals of the first connector; a data port at the main body and configured to receive sensor data from an external data interface board; and a tracking circuit embedded within the main body and configured to receive the sensor data from the external data interface board via the data port, to track a position of the harness tracking system, and to communicate the position and the sensor data to an external device.

In some embodiments, the tracking circuit includes: a global positioning system (GPS) circuit configured to track the position of the harness tracking system; a cellular transceiver configured to communicate the position to the external device in response to a command received from external device; and a controller configured to control operations of the GPS circuit and the cellular transceiver.

In some embodiments, the controller is further configured to receive the sensor data from the external data interface board via the data port, to process the sensor data, and to communicate the processed sensor data to the cellular transceiver for transmission to the external device.

In some embodiments, in the controller is configured to receive data from the external data interface board according to an RS232 protocol or an RS45 protocol.

In some embodiments, the external data interface board is configured to receive and process data from at least one of a brake sensor, a light sensor, a temperature sensor, a tire pressure sensor, a wheel speed sensor, smoke detector, speedometer, a vibration sensor, an axle hub sensor, a brake wear sensor, a door sensor, a position sensor, a digital microphone, and a camera.

BRIEF DESCRIPTION OF THE DRAWINGS

The accompanying drawings, together with the specification, illustrate exemplary embodiments of the invention, and, together with the description, serve to explain aspects of embodiments of the invention. In the drawings, like reference numerals are used throughout the figures to reference like features and components. The figures are not necessarily drawn to scale. The above and other features and aspects of the invention will become more apparent from the following detailed description of illustrative embodiments thereof with reference to the attached drawings, in which:

FIGS. 5A-5C illustrate various views of the base portion of the harness tracking system.

DETAILED DESCRIPTION

The detailed description set forth below is intended as a description of example embodiments of the invention, and is not intended to represent the only forms in which the invention may be constructed or utilized. The description sets forth the features of the invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the invention are directed to a harness tracking system that includes a tracking and communication device embedded within the electrical harness that carries signals between a tractor and a trailer. The preinstalled system eliminates the need for a retrofit installation and the associated cost. The inconspicuous location for the embedded tracking device reduces the potential for unauthorized tampering. In some embodiments, this tracking system can be activated remotely without access to the trailer.

Figure 1:
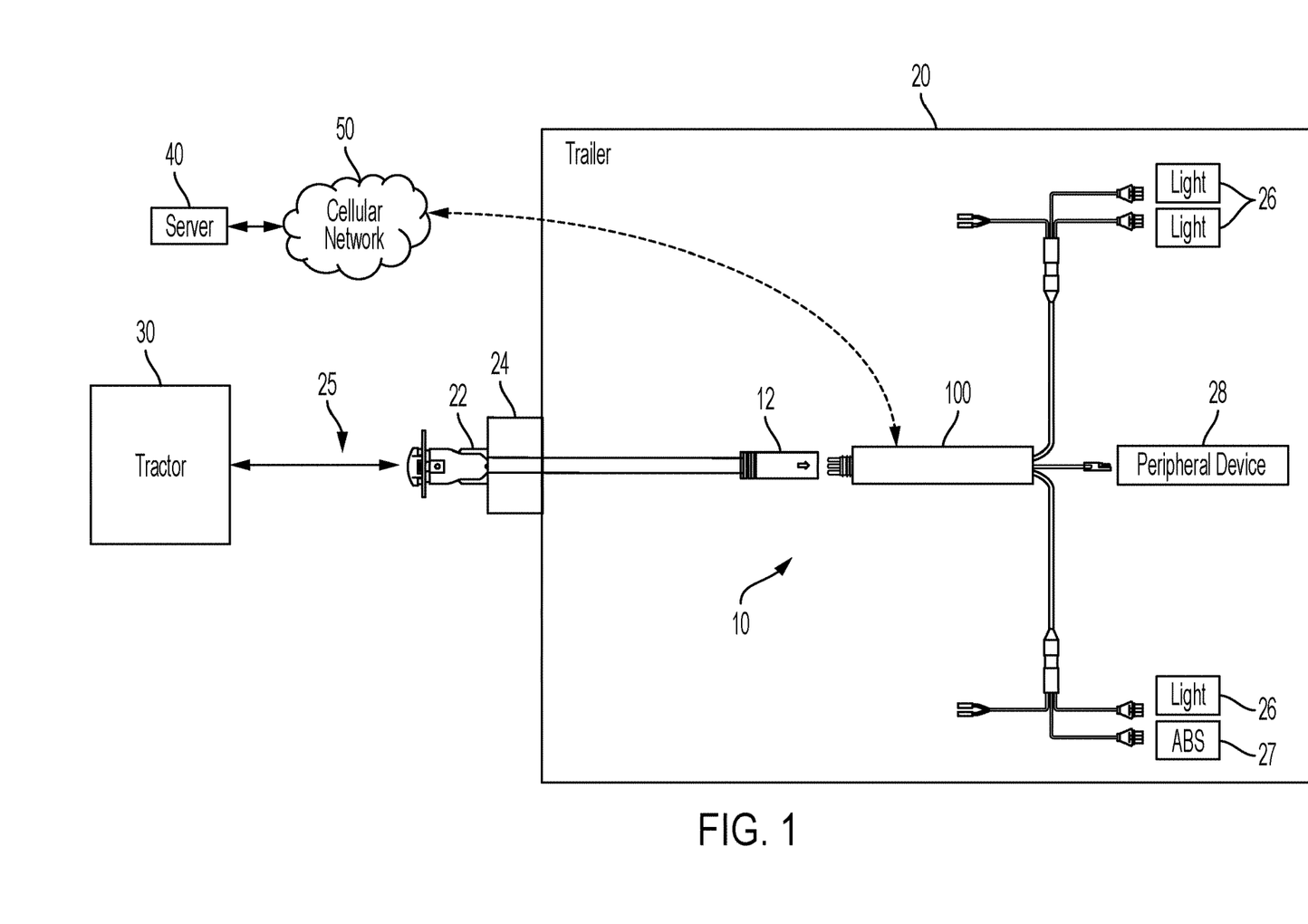
FIG. 1 illustrates an electrical wiring harness system including a harness tracking system, according to some embodiments of the present disclosure.

FIG. 1 illustrates an electrical wiring harness system 10 including a harness tracking system 100, according to some embodiments of the present disclosure.

In some examples, the electrical wiring harness system 10 of the trailer 20 provides electrical power from a coupled tractor 30 to the trailer 20 and its constituents components. The electrical systems of the tractor 30 and trailer 20 may be connected via an electrical cable 25 that may be plugged into a socket (e.g., a 7-way socket) 22 at the nosebox 24 of the trailer 20. The wiring harness system 10 may include a harness tracking system 100 and a harness connector 12, which may be a long cable that extends from the nosebox 24 to the back of the trailer 20 and supplies the electrical signals from the socket 22 to the harness tracking system 100. The harness tracking system 100 in turn supplies electrical power to various components within the trailer and also tracks the location of the trailer 20 and is capable of communicating the tracking information to an external device 40, such as a remote server or a mobile device, via a cellular network 50. In some examples, the harness connector 12 and the harness tracking system 100 may be routed through holes in the joists at the bottom of the trailer 20. In some examples, the width of the harness tracking system 100 may be less than an inch to allow it to be passed through 1 inch holes drilled in the joists.

Figure 2:
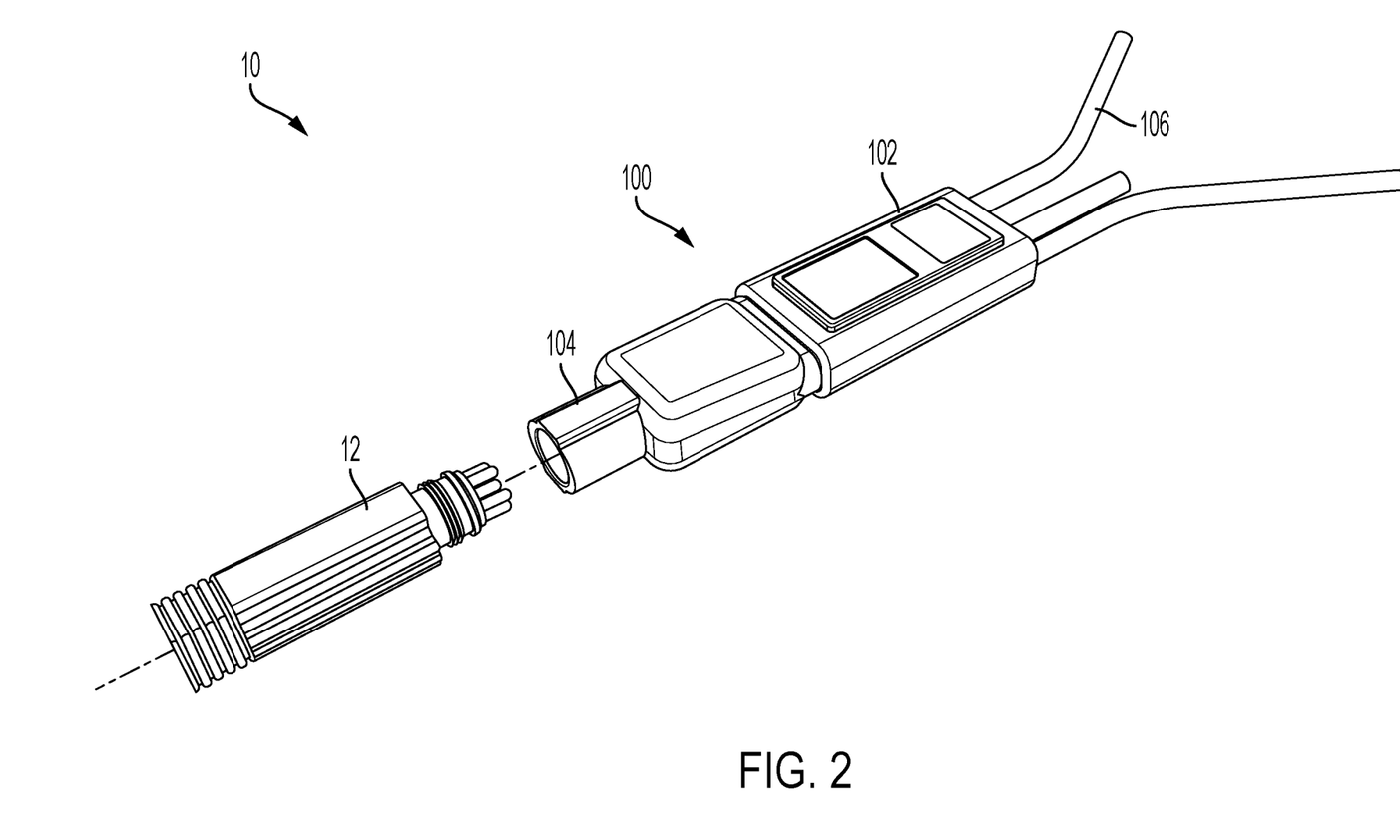
FIG. 2 illustrates a perspective view of a section of the electrical wiring harness system including the harness tracking system, according to some embodiments of the present disclosure.

FIG. 2 illustrates a perspective view of a section of the electrical wiring harness system 10 including the harness tracking system 100, according to some embodiments of the present disclosure. FIGS. 3A-3D illustrate a top view, a side view, a bottom view, and a perspective view, respectively, of the harness tracking system 100, according to some embodiments of the present disclosure.

Referring to FIGS. 2-3, in some embodiments, the harness tracking system 100 includes a main body 102, a first connector 104 at a first end of the main body 102, a plurality of wires 106 protruding from a second end (e.g., opposite from the first end of) the main body 102, and a tracking circuit 110 embedded within the main body 102. The first connector 104 may be a male or a female connector similar to those commonly referred to in the industry as a "Slim Seven" or "Trailer Harness Main Connector" and may include a plurality of terminals (e.g., male or female terminals) configured to transmit electrical signals. The first connector 104 is configured to mate with the harness connector 12, which encapsulates a plurality of conductors carrying various signals (e.g., electrical supply voltages, electrical ground, control signals, etc.) that contact the terminals of the first connector 104 when mated. The wires 106 are electrically connected to the plurality of terminals of the first connector 104 and provide electrical power to various electrical devices in the trailer 20, which may include one or more trailer lights 26, an anti-lock braking system (ABS) 27, and one or more peripheral devices 28, such a trailer refrigerator, a liftgate motor, a backup battery, etc. The tracking circuit 110 is configured to track a position of the harness tracking system 100 and to communicate the position to an external device 40.

Figure 3A:
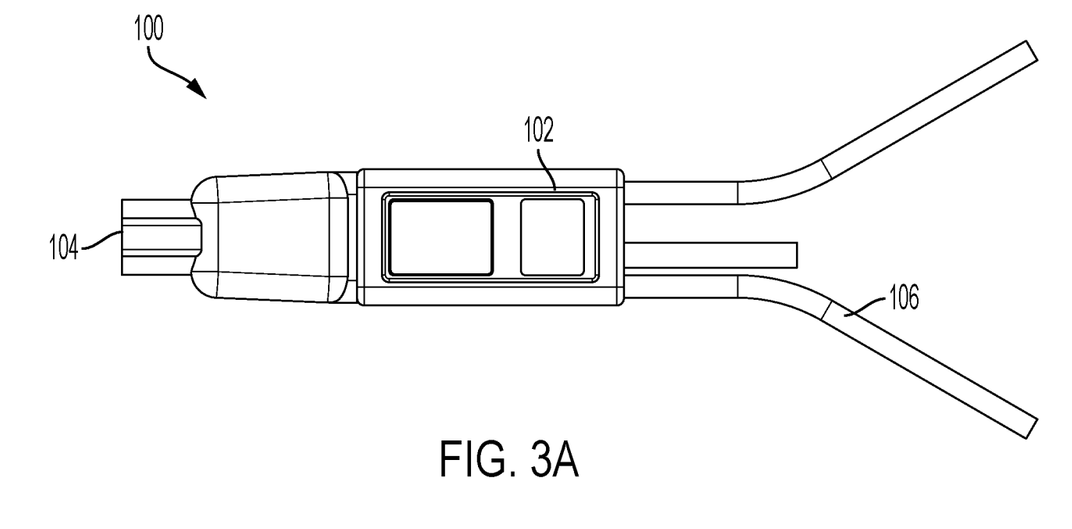
FIGS. 3A-3D illustrate a top view, a side view, a bottom view, and a perspective view, respectively, of the harness tracking system, according to some embodiments of the present disclosure.
Figure 3B:
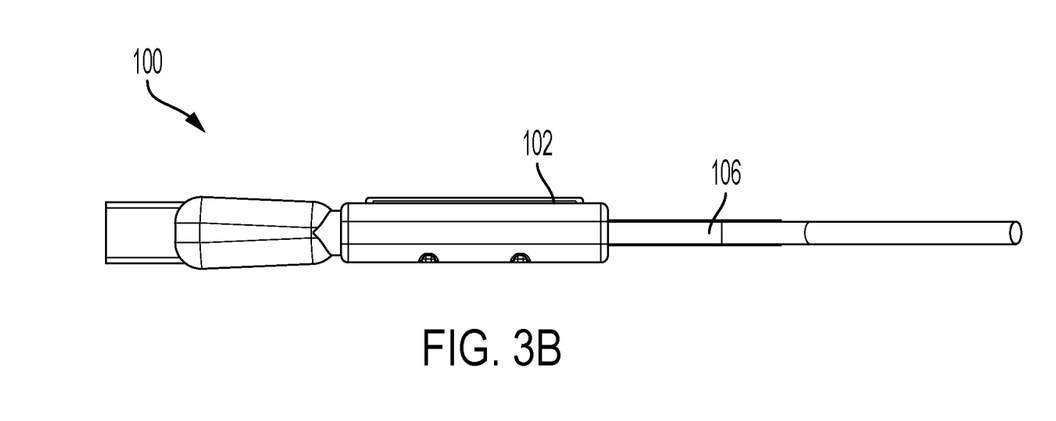
Figure 3C:
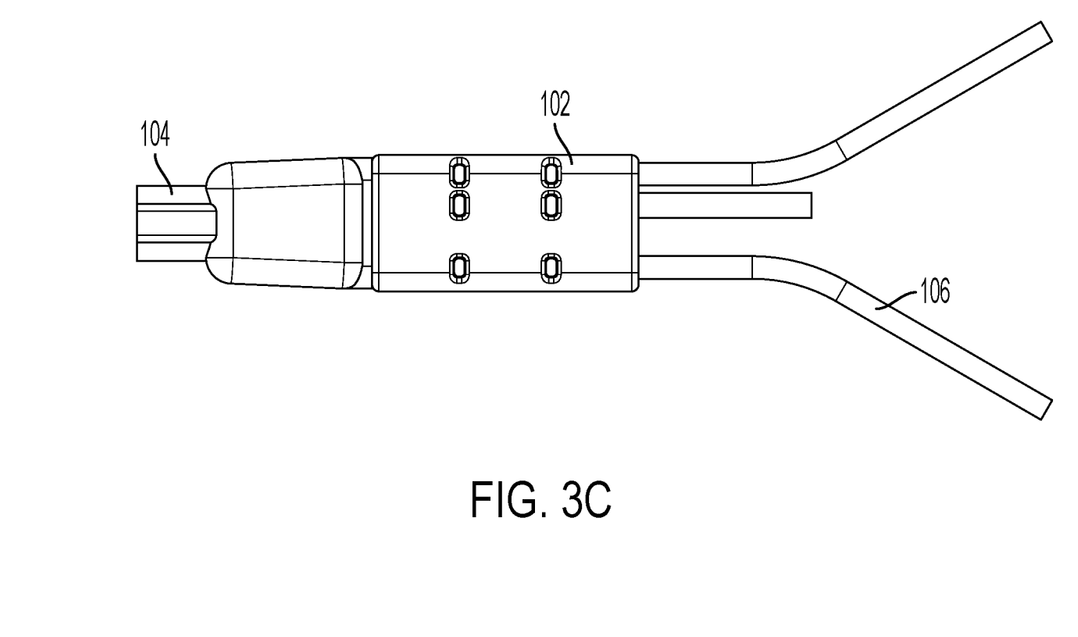
Figure 3D:
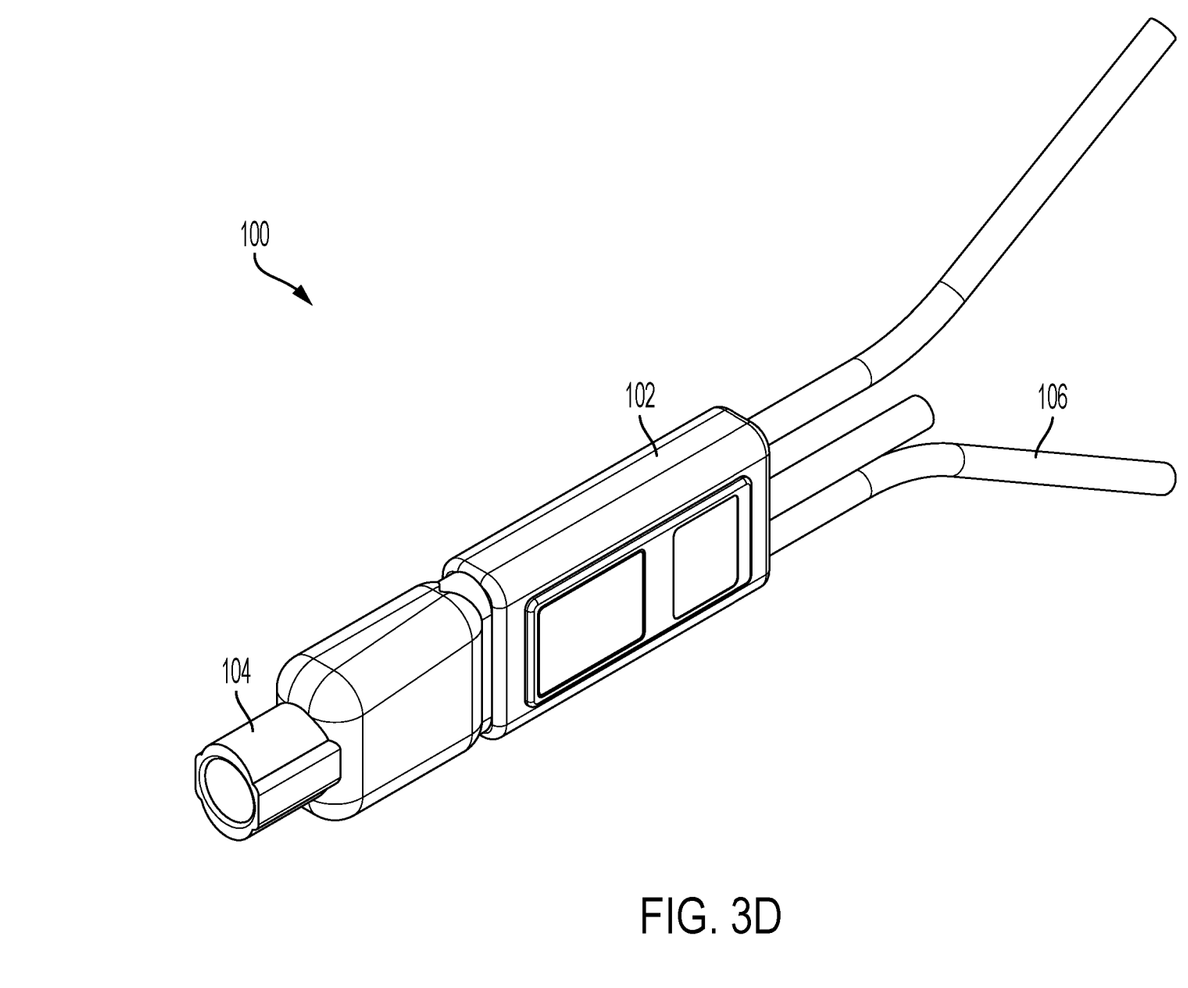

While FIGS. 2-3D illustrate three wires 106 protruding from the main body 102, embodiments of the present invention are not limited thereto, and the harness tracking system 100 may have any suitable number of wires 106 protruding from the main body 102.

In some embodiments, the main body 102 includes a base portion and an overmold portion, which encapsulates the tracking circuit 110.

Figure 4A:
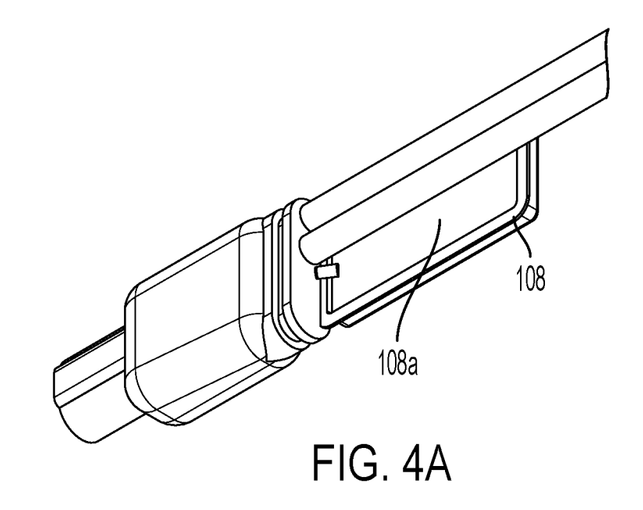
FIG. 4A illustrates the main body of the harness tracking system with only a base portion prior to overmolding, according to some embodiments of the present invention.
Figure 4B:
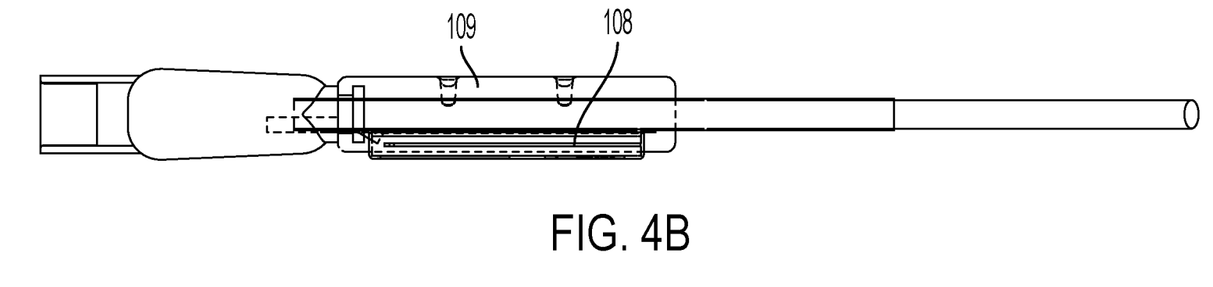
FIG. 4B illustrates a side view of the overmolded main body, according to some embodiments of the present invention.
Figure 5A:
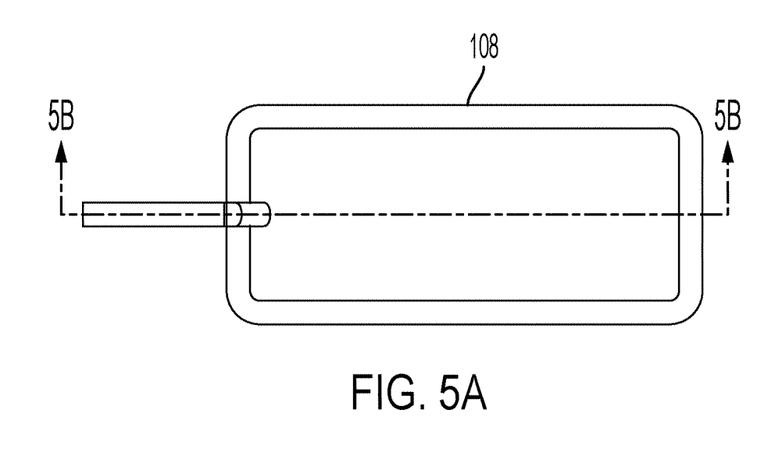
Figure 5B:
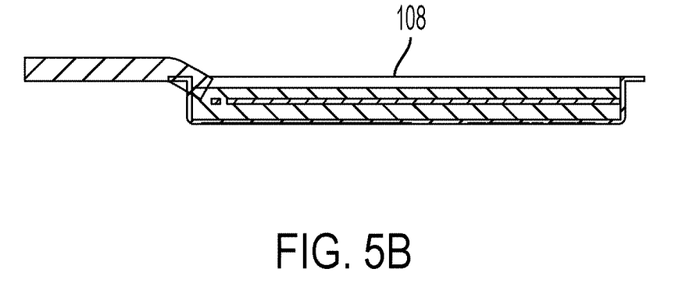
Figure 5C:
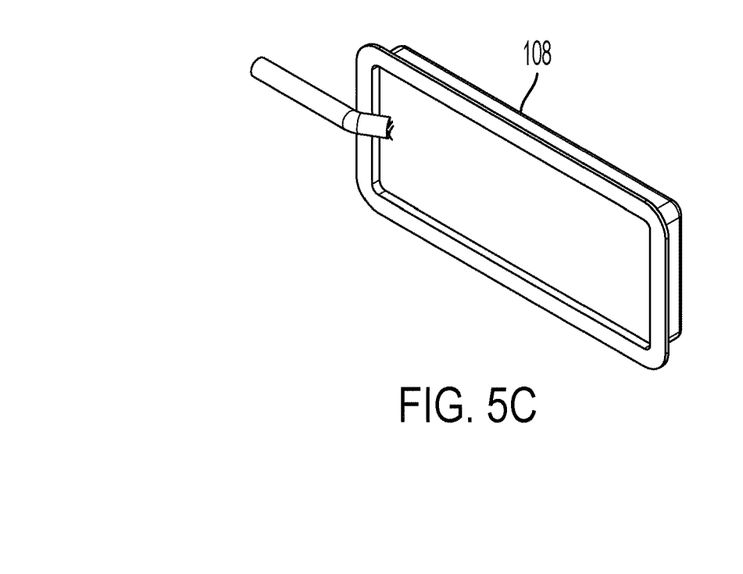

FIG. 4A illustrates the main body 102 with only a base portion 108 prior to overmolding, according to some embodiments of the present invention. FIG. 4B illustrates a side view of the overmolded main body 102, according to some embodiments of the present invention. FIGS. 5A-5C illustrate various views of the base portion 108, and FIG. 5D illustrates the tracking circuit 110, according to some embodiments of the present disclosure.

Figure 5D:
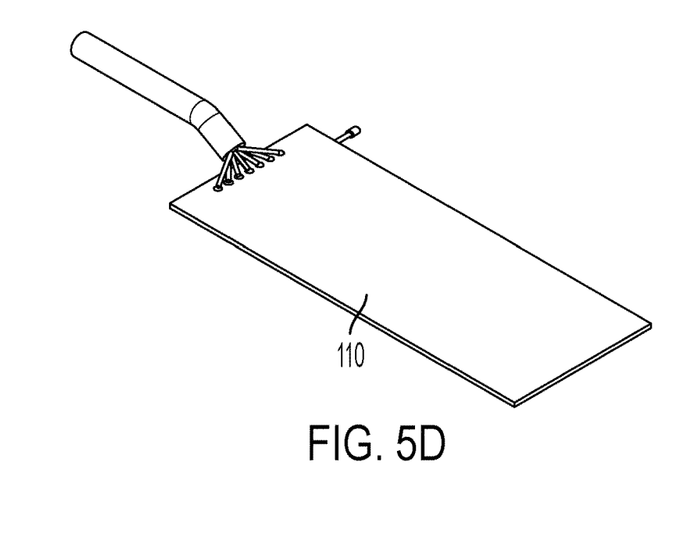
FIG. 5D illustrates the tracking circuit of the harness tracking system, according to some embodiments of the present disclosure.

Referring to FIGS. 4A-5D, the base portion (e.g., a potting portion) 108 of the main body 102 acts as a tray having a depression 108a that is configured to accommodate the board of tracking circuit 110 (shown in FIG. 5D). Once the tracking circuit 110 is positioned within the base portion 108, injection molding a layer of material over the base portion produces an overmolded portion 109 that together with the base portion 108 forms a single solid piece, which entirely encapsulates the tracking circuit 110. This serves to protect the tracking circuit 110 from impact and environmental elements, such as dirt, debris, moisture, etc. Further, the encapsulation conceals the tracking circuit 110 and prevents or substantially reduces the ability of someone to tamper with the device.

In some examples, the base portion 108 and the overmolded portion 109 may be formed of the same plastic material, such as a thermopolymer, a copolymer polyamide hot melt resin, or the like.

Figure 6:
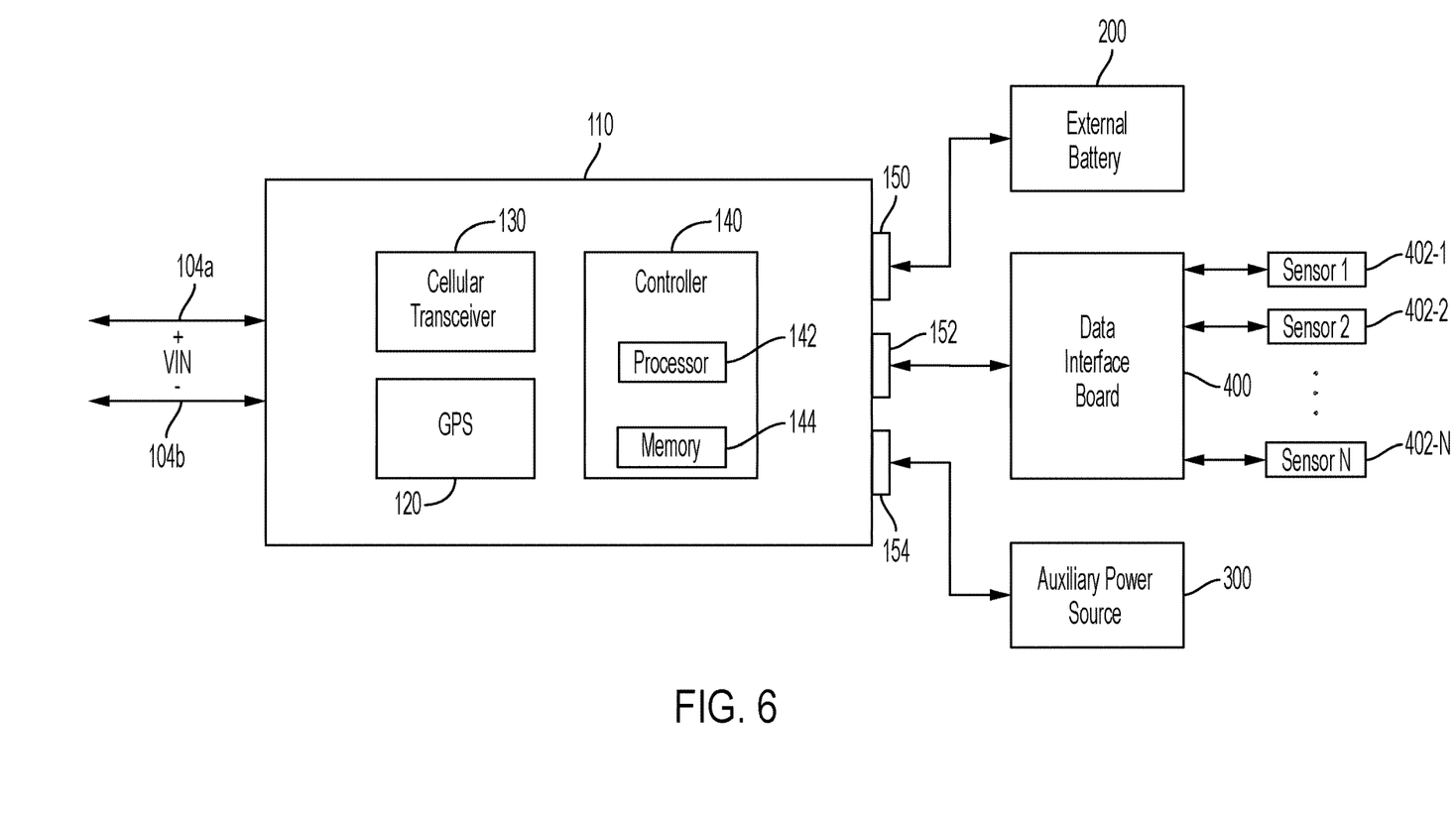
FIG. 6 illustrates a block diagram of the tracking circuit, according to some embodiments of the present invention.

FIG. 6 illustrates a block diagram of the tracking circuit 110, according to some embodiments of the present invention.

According to some embodiments, the tracking circuit 110 includes a global positioning system (GPS) circuit 120 configured to track the position of the harness tracking system 100, a cellular transceiver 130 configured to communicate the position to the external device in response to a command received from external device (e.g., remote server) 40, and a controller 140 configured to control operations of the GPS circuit 120 and the cellular transceiver 130. The controller 140 may include a processing circuit (e.g., a processor) 142 and a memory 144 that has instructions stored thereon that when executed by the processor cause the processor to perform the operations of the controller 140.

The harness tracking system 100 may be used as a primary mechanism for tracking a location of a trailer 20 or may act as a backup tracker on trailers that are equipped with other telematics devices. This is by virtue of an electronic subscriber identity module (e-SIM) card in the cellular transceiver 130 that can be remotely activated/deactivated, for example, via a command signal from the remote server 40. When the tracking feature of the harness tracking system 100 is not needed, a user (e.g., a fleet manager) may deactivate the e-SIM and place the tracking circuit 110 in a dormant state in which it is not in communication with a cellular network 50, and thus does not accrue regular (e.g., monthly) cellular connection fees. However, when the tracking feature is desired (e.g., when a primary telematics device fails/is not operational and/or when carrying high-profile and expensive cargo), the e-SIM may be activated to enable tracking of the trailer 20. Thus, the tracking harness system may represent a low-cost solution for tracking of trailers.

In some embodiments, the tracking circuit is electrically coupled to and can receive power from a power terminal 104a and a ground terminal 104b of the plurality of terminals of the first connector 104. Therefore, when the trailer 20 is coupled to a tractor 30 and receiving power via the electrical cable 25, the tracking circuit 110 may be powered through the terminals 104a and 104b of the first connector 104. However, when the trailer 20 is not paired with any tractor 30, the voltage on the power terminal 104a collapses and the tracking circuit 110 may be turned off.

In some embodiments, the main body 102 of the harness tracking system 100 includes a charge port 150 that is configured to be coupled to an external battery 200, which can provide power to the tracking circuit 110 in the absence of electrical power at the power terminal, such as when the trailer 20 is disconnected from the tractor 30. The charge port 150 also allows the external battery 200 to be charged when there is electrical power at the power terminal 104a. The external battery 200 thus enables the harness tracking system 100 to provide tracking functionality even when the trailer is not connected to a power source. In some examples, using the external battery 200, the harness tracking system 100 may be able to report data for several months while disconnected from a tractor 30.

In some examples, the trailer 20 may utilize an auxiliary power source 300, such as a battery storage, a generator, solar panels, etc., to power the various electrical components in the trailer 20 even in the absence of an electrical connection from a tractor 10. In such examples, the harness tracking system 100 may include an auxiliary power port 152 that can accept electrical power from the auxiliary power source 300 when no tractor is paired with the trailer 20 and when no external batter 200 is present.

According to some embodiments, the harness tracking system 100 further includes a data port 154 at the main body 102, which allows the tracking circuit 110 to interface with and receive data (e.g., sensor data) from an external data interface board (e.g., I/O board) 400. The external data interface board 400 may receive and process data from a plurality of sensors (402-1 to 402-N, N being an integer greater than 1) installed within the trailer 20, such as a brake sensor, a light sensor, a temperature sensor, a tire pressure sensor, a wheel speed sensor, smoke detector, speedometer, a vibration sensor, an axle hub sensor, a brake wear sensor, a door sensor, a position sensor, a digital microphone, a camera, and/or the like. The sensors 402 may be connected to the external data interface board 400 via a controller Area Network (CAN) bus. The external data interface board 400 can aggregate the sensor data and send it to the tracking circuit 110 through the data port 154 via a suitable protocol, such as recommended standard 232 (RS232) or RS485 protocol. The controller 140 then processes the sensor data and sends the processed data to the cellular transceiver 130 for transmission to the external device 40 via the cellular network 50. This allows the harness tracking system 100 to collect sensor data from a trailer and to communicate this data to the outside.

Accordingly, the harness tracking system 100 provides a number of features that are lacking in an unequipped trailer. These may include cost savings to the end user by eliminating the need for retrofit installation of a tracking device, allowing the customer installing the harness to activate service at a later date, and the encapsulated/integrated cellular device prevents unauthorized tampering.

While this invention has been described in detail with particular references to exemplary embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

The terminology used herein is for the purpose of describing particular embodiments and is not intended to be limiting of the inventive concept. As used herein, the singular forms "a" and "an" are intended to include the plural forms as well, unless the context clearly indicates otherwise. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on", "directly connected to", "directly coupled to", or "immediately adjacent to" another element or layer, there are no intervening elements or layers present.

As used herein, the terms "use", "using", and "used" may be considered synonymous with the terms "utilize", "utilizing", and "utilized", respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent variations in measured or calculated values that would be recognized by those of ordinary skill in the art.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The tracking circuit, the external data interface board, and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the tracking circuit and/or the external data interface board may be formed on one integrated circuit (IC) chip or on separate IC chips. Further, the various components of the tracking circuit and/or the external data interface board may be implemented on a flexible printed circuit film, a tape carrier package (TCP), a printed circuit board (PCB), or formed on a same substrate. Further, the various components of the tracking circuit and/or the external data interface board may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A harness tracking system of a vehicle, the harness tracking system comprising:
   a main body;
   a first connector at a first end of the main body and comprising a plurality of terminals configured to transmit electrical signals;

a plurality of wires at a second end of the main body opposite the first end, the plurality of wires being electrically connected to the plurality of terminals of the first connector;

a tracking circuit embedded within the main body and comprising a controller and a cellular transceiver, the tracking circuit being configured to track a position of the harness tracking system and to communicate the position to an external device; and a data port at the main body and configured to receive sensor data from an external data interface board and to transmit the sensor data to the controller, wherein the controller is configured to receive the sensor data from the external data interface board via the data port, to process the sensor data, and to communicate the processed sensor data to the cellular transceiver for transmission to the external device.

2. The harness tracking system of claim 1, wherein the main body comprises:

a base portion having a depression configured to accommodate the tracking circuit; and an overmold portion molded over the base portion and configured to entirely encapsulate the tracking circuit to protect the tracking circuit from environmental elements.

3. The harness tracking system of claim 1, wherein the first connector is configured to mate with, and be in electrical communication with, a harness connector coupled to a nosebox of a trailer, and wherein the plurality of wires are configured to transmit power to a plurality of electrical devices in the trailer.

4. The harness tracking system of claim 3, wherein the plurality of electrical devices comprises at least one of a trailer light, an anti-lock braking system (ABS), a trailer refrigerator, a liftgate motor, and a backup battery.

5. The harness tracking system of claim 1, wherein the first connector is a male connector or a female connector, and wherein the external device is an external server or a mobile device.

6. The harness tracking system of claim 1, wherein the tracking circuit comprises:

a global positioning system (GPS) circuit configured to track the position of the harness tracking system, wherein the cellular transceiver is configured to communicate the position to the external device in response to a command received from external device, wherein the controller is further configured to control operations of the GPS circuit and the cellular transceiver.

7. The harness tracking system of claim 1, wherein the controller is configured to receive data from the external data interface board according to an RS232 or an RS45 protocol, and wherein the external data interface board is configured to receive and process data from at least one of a brake sensor, a light sensor, a temperature sensor, a tire pressure sensor, a wheel speed sensor, smoke detector, speedometer, a vibration sensor, an axle hub sensor, a brake wear sensor, a door sensor, a position sensor, a digital microphone, and a camera.

8. The harness tracking system of claim 1, wherein the plurality of terminals comprise a power terminal and a ground terminal connected to the tracking circuit, and wherein the tracking circuit is configured to be powered by the power terminal.

9. The harness tracking system of claim 8, further comprising:

a charge port configured to be coupled to an external battery, and to charge the external battery in the presence of electrical power at the power terminal, wherein, in the absence of electrical power at the power terminal, the tracking circuit is configured to receive electrical power from the external battery through the charge port.

10. The harness tracking system of claim 8, further comprising:

an auxiliary port configured to be coupled to an auxiliary power source of a trailer, and to receive electrical power from the auxiliary power source in the absence of electrical power at the power terminal.

11. A harness tracking system of a vehicle, the harness tracking system comprising:

a main body;

a first connector at a first end of the main body and comprising a plurality of terminals configured to transmit electrical signals, the plurality of terminals comprise a power terminal and a ground terminal;

a plurality of wires at a second end of the main body opposite the first end, the plurality of wires being electrically connected to the plurality of terminals of the first connector;

a tracking circuit embedded within the main body and configured to track a position of the harness tracking system and to communicate the position to an external device, the tracking circuit being configured to be powered by the power terminal; and a charge port configured to be coupled to an external battery, to supply electrical charge to the external battery in the presence of electrical power at the power terminal, and to receive electrical power from the external battery in the absence of electrical power at the power terminal.

12. The harness tracking system of claim 11, wherein the main body comprises:

a base portion having a depression configured to accommodate the tracking circuit; and an overmold portion molded over the base portion and configured to entirely encapsulate the tracking circuit to protect the tracking circuit from environmental elements.

13. The harness tracking system of claim 11, wherein the first connector is configured to mate with, and be in electrical communication with, a harness connector coupled to a nosebox of a trailer, and wherein the plurality of wires are configured to transmit power to a plurality of electrical devices in the trailer.

14. The harness tracking system of claim 11, wherein the tracking circuit comprises:

a global positioning system (GPS) circuit configured to track the position of the harness tracking system;

a cellular transceiver configured to communicate the position to the external device in response to a command received from external device; and a controller configured to control operations of the GPS circuit and the cellular transceiver.

15. A harness tracking system of a vehicle, the harness tracking system comprising:

a main body;

a first connector at a first end of the main body and comprising a plurality of terminals configured to transmit electrical signals;

a plurality of wires at a second end of the main body opposite the first end, the plurality of wires being electrically connected to the plurality of terminals of the first connector;

a data port at the main body and configured to receive sensor data from an external data interface board; and a tracking circuit embedded within the main body and configured to receive the sensor data from the external data interface board via the data port, to track a position of the harness tracking system, and to communicate the position and the sensor data to an external device.

16. The harness tracking system of claim 15, wherein the tracking circuit comprises:
   a global positioning system (GPS) circuit configured to track the position of the harness tracking system;
   a cellular transceiver configured to communicate the position to the external device in response to a command received from external device; and
   a controller configured to control operations of the GPS circuit and the cellular transceiver.

17. The harness tracking system of claim 16, wherein the controller is further configured to receive the sensor data from the external data interface board via the data port, to process the sensor data, and to communicate the processed sensor data to the cellular transceiver for transmission to the external device.

18. The harness tracking system of claim 16, wherein the controller is configured to receive data from the external data interface board according to an RS232 protocol or an RS45 protocol.

19. The harness tracking system of claim 15, wherein the external data interface board is configured to receive and process data from at least one of a brake sensor, a light sensor, a temperature sensor, a tire pressure sensor, a wheel speed sensor, smoke detector, speedometer, a vibration sensor, an axle hub sensor, a brake wear sensor, a door sensor, a position sensor, a digital microphone, and a camera.

* * * * *